(12) United States Patent
Qin et al.

(10) Patent No.: US 6,411,865 B1
(45) Date of Patent: Jun. 25, 2002

(54) SYSTEM FOR PROTECTION ZONE SELECTION IN MICROPROCESSOR-BASED RELAYS IN AN ELECTRIC POWER SYSTEM

(75) Inventors: Bai-Lin Qin; Armando Guzman-Casillas, both of Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 198 days.

(21) Appl. No.: 09/603,824

(22) Filed: Jun. 26, 2000

(51) Int. Cl.[7] .................. G05B 11/01; G05B 9/02; H01H 9/54; H01H 73/00
(52) U.S. Cl. .............. 700/286; 700/22; 700/292; 307/140; 361/115
(58) Field of Search .................. 700/22, 89, 286, 700/292, 297; 323/322; 307/132 R, 132 E, 139, 140; 361/62, 64, 115

(56) References Cited

U.S. PATENT DOCUMENTS

| | | | | |
|---|---|---|---|---|
| 4,689,708 A | * | 8/1987 | Hager et al. ............. | 361/65 |
| 4,767,941 A | * | 8/1988 | Brand et al. ............. | 382/205 |
| 5,629,862 A | * | 5/1997 | Brandwajn et al. ........ | 307/20 |
| 6,008,971 A | * | 12/1999 | Duba et al. ............. | 361/64 |
| 6,181,984 B1 | * | 1/2001 | Sawa et al. ............. | 700/286 |

* cited by examiner

Primary Examiner—Leo Picard
Assistant Examiner—Elliot Frank
(74) Attorney, Agent, or Firm—Jensen & Puntigam, P.S.

(57) ABSTRACT

The system uses graph theory to define busline arrangements as a series of vertices and edges, wherein the vertices include the number of busses in the system and the edges include disconnect circuit branches connecting the individual vertices. A particular system configuration, selected by the system operator, determines the status (open or closed) of the various disconnect branches. A processor establishes an incident graph matrix, including positions of all the vertices and edges. The matrix is modified in accordance with graph theory and the condition of the disconnect switches. Graph operations are performed to produce a resulting matrix which defines vertices and the edges incident thereon into zones of protection. Fault analysis in the busline can then be performed in accordance with each zone of protection.

11 Claims, 8 Drawing Sheets

|  | EDGES |  |  |  |  |  |  |  |  |  |  |  |  |  |  |  |
|---|---|---|---|---|---|---|---|---|---|---|---|---|---|---|---|---|
| VERTICES | | 74 | 75 | 76 | 92 | 77 | 78 | 91 | 93 | 83 | 82 | 84 | 85 | 88 | 87 | 89 | 90 |
| | 62 | 74 | 0 | 0 | -92 | 0 | 0 | 0 | 0 | 83 | 0 | 0 | 85 | 0 | 0 | 0 | 0 |
| | 63 | 0 | 0 | 0 | 92 | 0 | 0 | 91 | 0 | 0 | 0 | 0 | 0 | 88 | 0 | 0 | 90 |
| | ⋮ | | | | | | | | | | | | | | | | |
| | 73 | 0 | 0 | 0 | 0 | 0 | -76 | 0 | 0 | 0 | 0 | 0 | 0 | 0 | 0 | 0 | 0 |

FIG.10

|  | EDGES | | | | | | | | | | |
|---|---|---|---|---|---|---|---|---|---|---|---|
| VERTICES | | 74 | 75 | 76 | 92 | 77 | 78 | 91 | 93 | | 90 |
| | 100 | 74 | 75 | 0 | -92 | 0 | 0 | 0 | 0 | — — — — — — | 0 |
| | 104 | 0 | 0 | 0 | 92 | 77 | 0 | 91 | 0 | — — — — — — | 0 |
| | 102 | -74 | 0 | 76 | 0 | 0 | 0 | 0 | 0 | — — — — — — | 0 |
| | 106 | 0 | 0 | 0 | 0 | 0 | 78 | -91 | 0 | — — — — — — | 0 |

FIG.11

|  | EDGES | | | | | | | | |
|---|---|---|---|---|---|---|---|---|---|
| VERTICES | 74 | 75 | 76 | 92 | 77 | 78 | 91 | 93 ... | 90 |
| 100 | 0 | 75 | 76 | -92 | 0 | 78 | -91 | 0 ——————— | 0 |
| 104 | 0 | 0 | 0 | 92 | 77 | 0 | 91 | 0 ——————— | 0 |
| 102 | 0 | 0 | 0 | 0 | 0 | 0 | 0 | 0 ——————— | 0 |
| 106 | 0 | 0 | 0 | 0 | 0 | 0 | 0 | 0 ——————— | 0 |

FIG.12

|  | INCIDENT EDGES (FIG.4) |
|---|---|
| 62 | 74, 83, 85, -92 |
| 63 | 88, 90, 91, 92 |
| 64 | -74, -93, 82, 84 |
| 65 | -91, 93, 87, 89 |
| 66 | 75, -83, -82 |
| 67 | 76, -84, -85 |
| 68 | 77, -88, -87 |
| 69 | 78, -89, -90 |
| 70 | -75 |
| 71 | -76 |
| 72 | -77 |
| 73 | -78 |

SYSTEM FOR PROTECTION ZONE SELECTION IN MICROPROCESSOR-BASED RELAYS IN AN ELECTRIC POWER SYSTEM

TECHNICAL FIELD

This invention relates generally to protection zone selection systems for microprocessor-based bus protection relays, and more specifically concerns protection zone selection systems using graph/matrix theory.

BACKGROUND OF THE INVENTION

In power system networks, a busline (also referred to as a busbar) provides a connection capability for various electrical circuits, including electrical generation, transmission and load circuits. If a fault occurs on a particular bus, the circuit or circuits which supply the fault current to the busline must trip their associated circuit breakers to isolate the fault from the other circuits connected to the busline. A bus fault may result in significant loss of service and, hence, busline arrangements are typically designed to minimize the number of circuits which must be opened in the event of a fault on the bus.

For various reasons, including improvements in energy availability and improved flexibility in busline system operations, busline arrangements have become more complex, with more circuits and individual busses involved in a given arrangement than previously. Such complexity requires in turn more sophisticated busline protection arrangements involving selection of protection zones for the bus in accordance with the particular configuration of the busline. It is important that the protection zone selection system operate such that the protection zones correlate appropriately with the busline arrangement so that the protective relay for the bus operates only for a protection zone fault.

In the past, both electromechanical and analog electronic relays have been used for bus protection in electric power systems. Most uses of such relays for bus protection were and still are for relatively simple bus arrangements. With the more sophisticated, multiple bus arrangements, electromechanical relay approaches are particularly complicated, unreliable and expensive.

Analog electronic bus relays, on the other hand have been more widely used than electromechanical relays to protect the more complex bus arrangements. Various approaches have been used involving analog electronic bus relays.

One approach uses directional comparison with a current differential scheme. In operation, the relay switches current direction signals for directional comparison and switches current transformer (CT) secondary current signals for the differential approach. However, the CT secondary current switching approach for protection zone selection may result in a hazard by virtue of an open CT secondary circuit.

In another analog approach, electronic relay approach a medium impedance differential bus relay has been developed which avoids the hazards of the first approach. Switching occurs on the secondary of ratio matching CTs, eliminating an open circuit in the main CT secondary. This arrangement still requires switching trip circuits, however, even though it does eliminate CT switching.

In still another approach, auxiliary relays are used to represent the various disconnect switches in the bus arrangement. Modular relays are designed to replicate the station bus components. The replica framework can then be arranged in different configurations to provide varied possible protection zone schemes for evaluation relative to different bus arrangements. However, the design and implementation of replica devices is considered to be a major drawback.

In the present application, a new approach for protection zone selection is disclosed using graph/matrix theory with microprocessor-based bus relays. This new approach eliminates the disadvantages associated with the various known approaches described above and is applicable to any bus arrangement in power system stations.

DISCLOSURE OF THE INVENTION

Accordingly, the present invention is a system for protection zone selection for a power system bus, comprising: means for receiving information concerning a bus arrangement in a power system, including the number of busses in the arrangement, and graph-based information concerning the arrangement, including the identification of vertex and edge portions of the bus arrangement, wherein said edges include disconnect circuit breakers and current transformer (CT) branches and said branches include the busses and convergence points between disconnect branches and circuit breaker-CT branches; means for receiving the operational status of the disconnect branches and the circuit breakers, said operational status defining a selected operational configuration of the bus arrangement; a processor for establishing an incidence graph arrangement indicative of said vertexes and edges of the various vertexes, and for altering the established graph matrix based on an actual operation status of the disconnect switches and the current breakers; and means for selecting a series of protection zones covering the busses in the bus arrangement from the graph arrangement.

BEST MODE FOR CARRYING OUT THE INVENTION

Bus arrangements at a power system station will typically include one or more individual busses, as well as circuit breakers, current transformers (CTs), disconnect switches and the incoming and outgoing power lines. Each of these components are typically included in what are referred to "circuit branches", which extend between selected circuit elements such as busses and other convergence points. Examples of circuit breakers include a breaker branch, a CT branch, a breaker-CT branch and a disconnect branch. A circuit breaker branch is a connection which contains a circuit breaker capable of interrupting load and fault currents. A CT branch is a connection which comprises a current transformer. The protective relay obtains digital input and current signals from the CT. A breaker-CT branch is a connection which represents a combination of a circuit breaker and a current transformer (CT). A disconnect branch could be a connection with a disconnect switch or a breaker branch without a CT, or other element which permits the station configuration to be changed when no load current is present. Disconnect switches are typically used, for example, to isolate parts of the bus system for maintenance and to change the connections between multiple busses.

For instance, relative to system configuration, a disconnect switch can be used, when closed, to effectively combine two busses into one or, when open, to maintain two busses separate. Further, where multiple busses are involved, a breaker/CT branch can serve as a "tie-breaker" to connect two busses.

A single zone of protection for a particular bus arrangement may cover a single bus or multiple busses interconnected through disconnect switches. A complex bus arrangement will typically involve several zones of protection, which will vary depending upon the particular bus arrangement configuration, which in turn will vary depending upon the pattern of open and closed disconnect switches. Bus relays must be capable of handling the various protection zone possibilities as the configuration of a particular station bus changes.

The present invention uses graph/matrix theory in order to represent a power system bus arrangement in such a way that the protection zones for the bus can be readily changed to accommodate a change of configuration of the bus arrangement. In graph theory, a first plurality of locations in the bus arrangement are referred to as vertices ($V_1$, $V_2$, $V_3$ ... $V_n$), while a second plurality of connecting elements are called edges ($E_1$, $E_2$ ... $E_n$). The edges connect or link the vertices. The basic application of graph theory, specifically, the use of vertices and edges to represent a particular power system arrangement can be seen initially in FIGS. 1–3 and in the following explanation.

Figure 1:
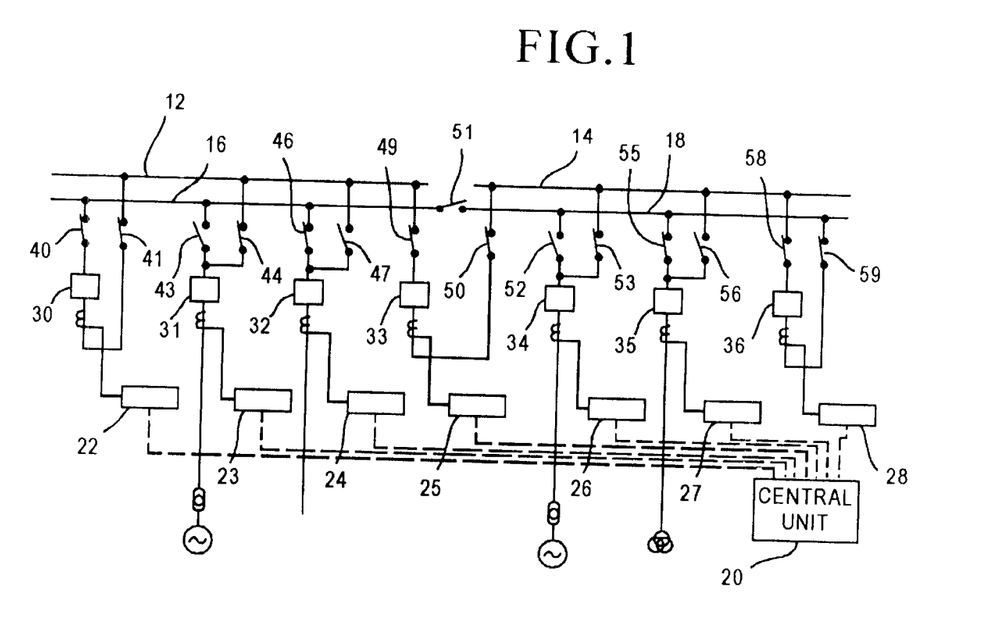
FIG. 1 is a diagram showing a first example of a power system bus arrangement, using a sectionalized double bus.

FIG. 1 shows a particular bus arrangement, specifically what is referred to as a sectionalized double bus arrangement with a bus tie, with a plurality of circuit breakers connected to the busses. The four busses in FIG. 1 are indicated at 12, 14, 16 and 18. A central unit 20 portion of the protective relay for the bus communicates with seven bay units 22–28 which are installed at seven breaker-CT branches, referenced at 30–36. The bay units acquire current and digital input information. The bay units send the acquired information to the central unit 20, which processes the information, makes the protection zone selection, runs the differential protection algorithms and then sends back trip instructions, if necessary, to the bay units. The bay units provide trip outputs for the circuit breakers in the associated breaker-CT branches.

In the bus arrangement of FIG. 1, three of the breaker-CT branches are used as bus ties to connect two busses. Breaker-CT branch 30 connects busses 12 and 16; breaker CT-branch 33 connects busses 12 and 14; while breaker CT-branch 36 connects busses 14 and 18. The remaining four breaker-CT branches, i.e. 31, 32, 34 and 35, terminate at the busses; breaker-CT branch 30 connects to the busses 12, 16 through disconnect switches (branches) 40, 41; branch 31 connects to busses 12 and 16 through disconnect switches 43, 44; branch 32 connects to busses 12 and 16 through disconnect switches 46, 47; branch 33 connects to busses 12 and 14 through disconnect switches 49, 50; branch 34 connects to busses 14 and 18 through disconnect switches 52 and 53; branch 35 connects to busses 14 and 18 through disconnect switches 55 and 56; and branch 36 connects to busses 14 and 18 through disconnect switches 58 and 59.

It should be emphasized that the particular bus arrangement shown in FIG. 1 is to illustrate the use of graph theory in protection zone selection. It is, however, only one bus arrangement out of many possible. Graph theory as explained relative to FIG. 1 can be used for basically any bus arrangement.

Figure 2:
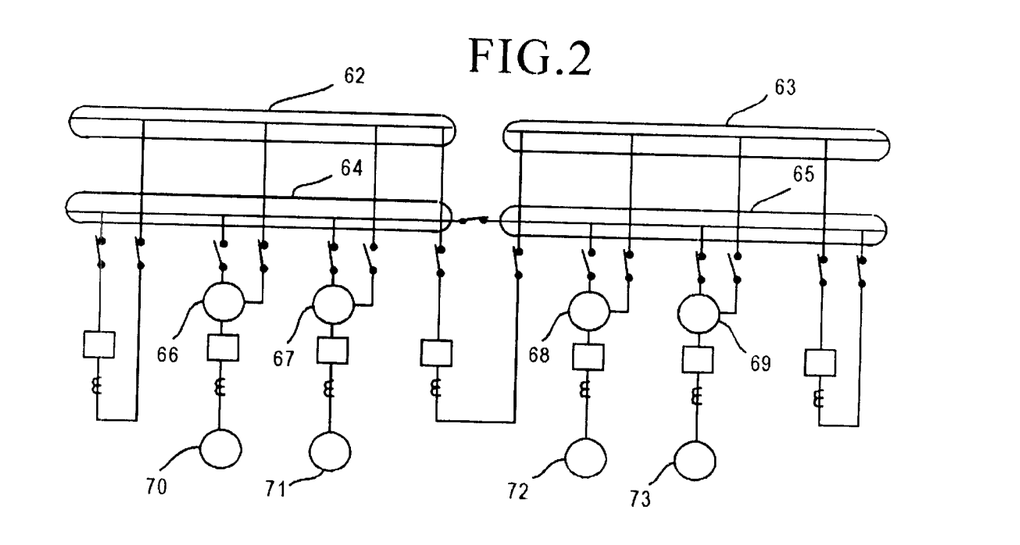
FIG. 2 is a diagram showing assigned vertices for the bus arrangement of FIG. 1.

FIG. 2 shows a first step in the use of graph theory relative to protection zone selection for a bus. FIG. 2 identifies certain points as vertices. In particular, each vertex represents a bus, a branch convergence point or branch termination point. In the bus arrangement of FIG. 1, each of the busses 12, 14, 16 and 18 represents a single vertex. The convergence points between disconnect branches and breaker-CT branches are also vertices, as are branch termination points. In the embodiment shown, these vertices are indicated at 66–73, with vertices 66–69 being convergent points between breaker-CT branches and disconnect branches, while vertices 70–73 are at termination points in the bus arrangement. The identification of the vertices is clear and straightforward relative to FIG. 1, following the definition of a vertex outlined above. The same vertex identification approach is valid for virtually any bus arrangement.

Figure 3:
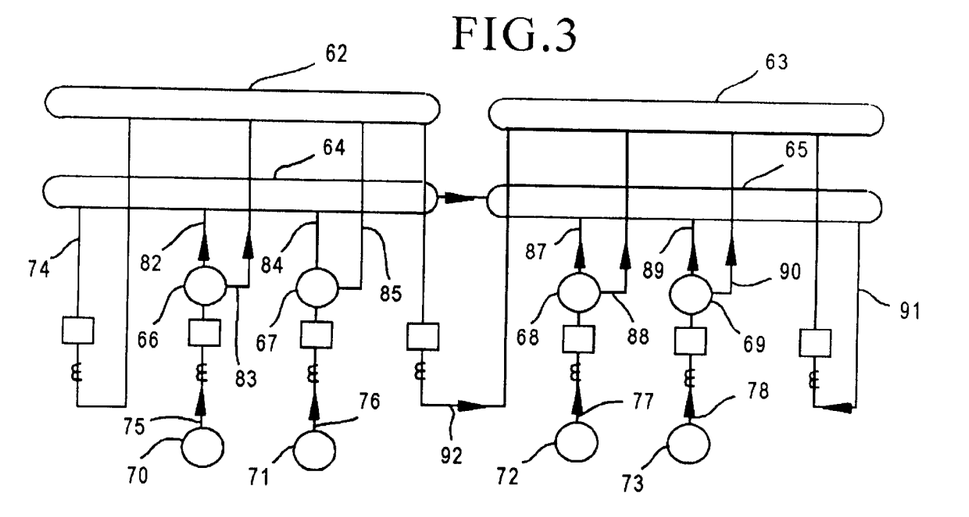
FIG. 3 is a diagram showing vertices and edges for the bus arrangement of FIG. 1 using the graph/matrix approach of the present invention.

The next step in applying graph theory to the system of FIG. 1 is the identification of edges which represent the various branches of the system, extending between the vertices. This is shown in FIG. 3. Again, the various possible branches are breaker branches, CT branches, breaker-CT branches and disconnect branches. In FIG. 3, branches 74, 75, 76, 77, 78, 91 and 92 are breaker-CT branches; branches 82–85, 87–90 and 93 are all disconnect branches. FIG. 3 shows the bus arrangement of FIG. 1 converted into a graphic representation comprising vertices and edges in accordance with the definitions thereof provided above.

Each of the individual edges which connect the vertices have a reference direction, which can be selected either arbitrarily or assigned according to the CT polarity for the CT branches. In the present case, a negative sign indicates an edge extending away from the vertex, while no sign indicates an edge extending toward the vertex.

The operational status of the disconnect branches, i.e. either opened or closed, defines the particular bus configuration for which the protection zone configuration is determined. At different points in time, the bus configuration will change, depending upon the particular status of the various disconnect switches, which are controlled by the system operator. As mentioned above, the bus system configuration changes when, as one example, certain portions of the bus arrangement are temporarily isolated for maintenance. Selected disconnect switches are opened to produce the desired isolation. Other bus configurations result because of a different arrangement of the individual buslines as they are either connected together or maintained separated. Other system operational considerations will produce other bus configurations produced by different patterns of disconnect switch closures, as controlled by the system operator.

Particular examples of various configurations of the bus arrangement of FIG. 1, with their corresponding effect upon the resulting graph representation, relative to the initial representation shown in FIG. 3, and the resulting protection zone configuration, are discussed below. It should be noted that the arrangement of FIG. 1 does not include separate breaker branches or separate CT branches. Accordingly, no edges in FIG. 3 represents those two particular possible branch types. However, it should be understood that other bus arrangements could include such branches. Appropriate edges would be used to represent the breaker branches and the CT branches.

The following describes graph operations as they are used to produce protection zone selection for a various configurations of the particular bus arrangement of FIG. 1. In a graph approach (FIG. 3) which represents the bus arrangement of FIG. 1, the various edges are classified either as switching edges or weighted edges. Switching edges basically are the disconnect branches, while weighted edges are the breaker CT branches. Further, the various vertices are categorized as either bus vertices, i.e. those vertices which identify actual busses, and all other vertices, which are indicated to be non-bus vertices. Graph operations in the present system are performed only on switching edges and bus vertices.

Figure 4:
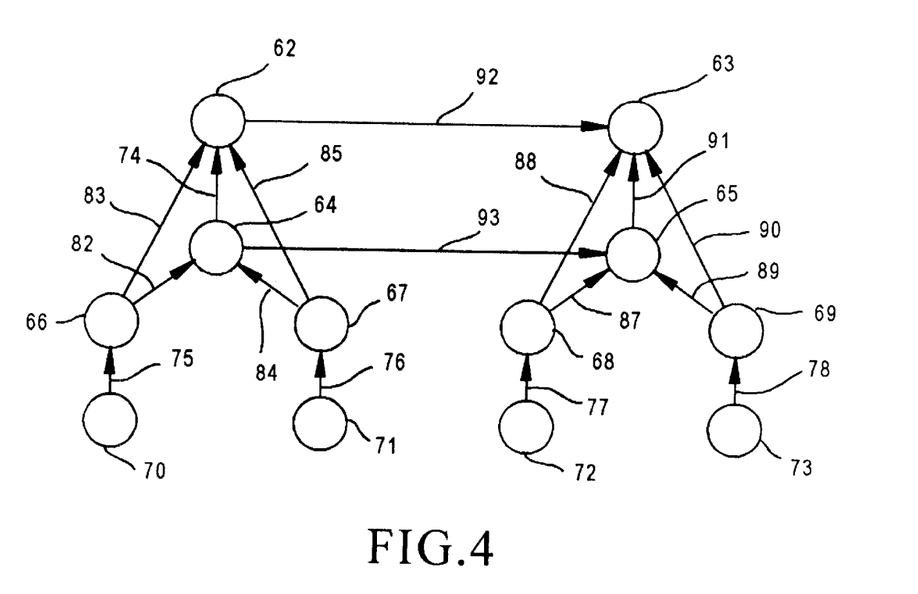
FIG. 4 is a graphical representation of the bus arrangement of FIG. 1.

FIG. 4 shows the actual graphical equivalent of the bus arrangement of FIGS. 1 and 3, using the definition of vertices and edges as defined above. The first graph operation performed in order to determine an appropriate protection zone arrangement for the bus arrangement of FIG. 1 is on the switching edges. If a particular disconnect in a switching edge is opened by the operation, the corresponding graph operation is the removal of that particular edge, i.e. that edge is removed from the graph representation. Various selected switches are opened by the system operator for selected system operations, resulting in a selected bus configuration.

Figure 5:
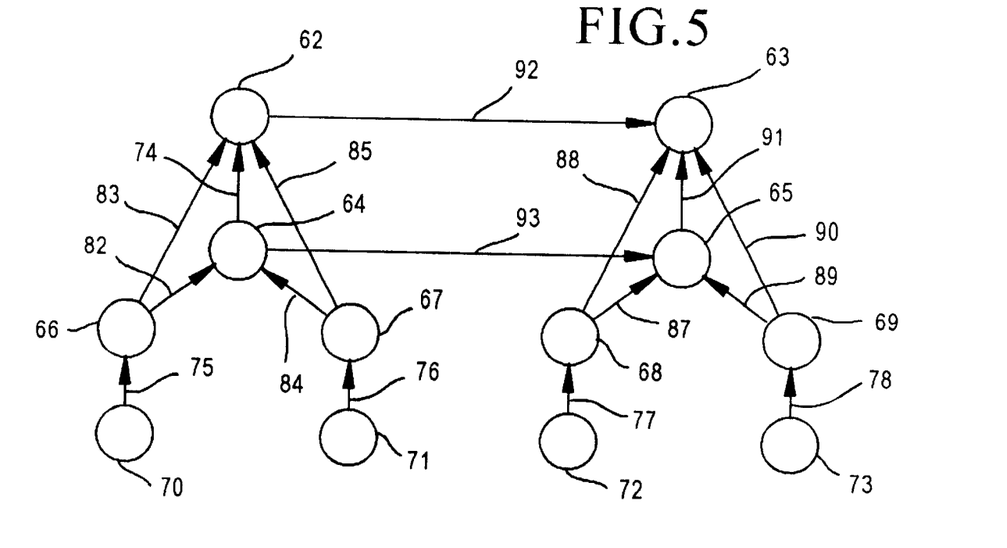
FIG. 5 is a modification of the graphical representation of FIG. 4, with selected edges being open.

FIG. 5 shows the basic graph of FIG. 4, with switching edges 82, 85, 87, 90 and 93 open, i.e. removed from the graph of FIG. 3. This is by way of one example; the actual switching edges to be removed from a basic graph depends upon the decisions of the system operator to achieve a particular bus configuration.

Figure 6:
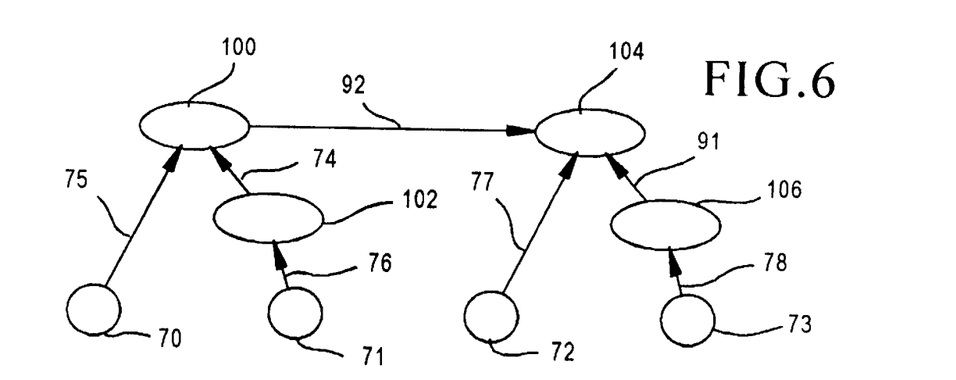
FIG. 6 is a modification of FIG. 5, with selected edges being closed

A second graph operation involves the switching edges (the disconnect branches) which are closed (i.e. normal operation). When a switching edge is closed, that edge "contracts", under graph theory, resulting in the merging of the two vertices at the respective ends of the edge, so as to produce a new single, combined vertex. A new "combined" vertex replaces the two original vertices. All of the edges which were incident at the original two vertices are now incident at the new, combined vertex. As an example, FIG. 6 shows a modified FIG. 5 graph where original switching edges 83, 84, 88 and 89 (FIG. 4) are closed. Hence, in accordance with the above-described graph operations, vertices 62 and 66 (FIG. 5) can be combined, as can vertices 64 and 67, vertices 63 and 68, and vertices 65 and 69. FIG. 6 shows the graphical result of the selected edges being closed and the appropriate vertices merged. As can be seen, FIG. 6 is a significant simplification of the original graph representation of FIG. 3, for the bus arrangement of FIG. 1.

With respect to the determination of protection zones, if a particular bus vertex is not connected to any other bus vertices via switching edges, then that bus vertex will be selected as being within a single protection zone. That single zone covers all the set of edges incident on that bus vertex. If two bus vertices are end points of a particular edge which represents a closed disconnect branch, then a new incident set of edges on the combined vertex includes all of the edges which were incident initially on the two vertices; however, it does not include those which are originally incident on both vertices.

In FIG. 5, the two vertices 62, 66 define a single protection zone incorporating all of the incident edges thereon. The same is true for vertices 64 and 67, vertices 63 and 68, and vertices 65 and 69. From FIG. 6, vertices 62 and 66 form a combined vertex 100, vertices 64 and 67 form a combined vertex 102, vertices 63 and 68 form a combined vertex 104, and vertices 65 and 69 form a combined vertex 106. Zone 1 protection thus includes vertex 100 with incident switching edges 74, 75 and −92 (note reference direction is negative for the edge extending away from the vertex); Zone 2 is the combined vertex 104, with incident switching edges 92, 77 and 91; Zone 3 is combined vertex 102, with switching edges −74 and 76; while Zone 4 is combined vertex 106, with incident edges −91 and 78.

Figure 7:
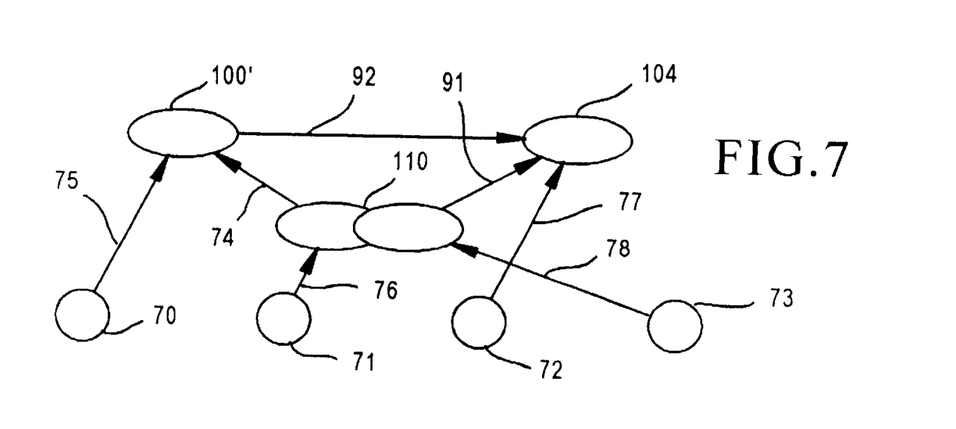
FIG. 7 is a diagram showing a modification of FIG. 6, with an additional selected edge being closed.

An example involving a further graph operation on FIG. 6 includes the closing of another switching edge, i.e. edge 93 (see FIG. 4), which was previously open. All other switches have the same configuration. The graph result is shown in FIG. 7. In FIG. 7 switching edge 93 (FIG. 4) contracts, merging combined bus vertices 102 and 106 of FIG. 6 into a new bus vertex 110. The protection zone selection then changes to accommodate the new bus configuration. Zone 1 covers vertex 100 with incident edges 74, 75 and −92; Zone 2 covers vertex 104 with incident edges 77, 91 and 92; and Zone 3 covers vertex 110, with incident edges −74, 76, 78 and −91. Since previous bus vertices 102 and 106 have been further combined into new bus vertex 110, only three zones of protection are necessary (all the bus vertices have been covered) and Zone 4 is thus zero.

A further example involves an evolution of the arrangement of FIG. 7 by closing another edge 82 (see FIG. 4). The closing of edge 82 (previously open) will result in combined vertices 100 and 110 contracting into a single new vertex 112. In this arrangement, shown in FIG. 8, with only two vertices left, there are only two zones of protection. Zone 1, covering bus vertex 112, has the following incident edges: 75, 76, 78, −91 and −92, while Zone 2, covering vertex 104, has incident edges of 77, 91, and 92.

Thus, several examples have been given of how graph theory results in the selection of zones of protection for various bus system configurations.

The following explanation is directed toward the use of graph theory to develop a corresponding matrix which can be used by a microprocessor to automatically select the zones of protection. A graph with several vertices and edges, such as FIG. 4, can be converted into a matrix having the same number of rows as vertices, and the same number of columns as edges. The combination of the rows and the columns forms an incidence matrix. The resulting incidence matrix is in fact the coefficient matrix of Kirchhoff's current equations in electric power networks. The matrix is thus of significant interest relative to bus differential protection in microprocessor based relays, because the relay can establish the zones of protection and then perform its differential current comparisons to detect faults in the selected zones.

In a matrix, each row of a matrix represents a vertex in the system and the incident set of edges corresponding to that vertex. In a matrix, if a switching edge is open, the column positions corresponding to that particular edge (for all the vertices on which it is incident) are zero, while if the switching edge is closed, the column positions are in effect first set to one and then a contracting operation is performed (similar to the operations shown in FIGS. 5–8. In matrix operations, the rows representing the two end point vertices for the closed edge are combined, with the originating vertex row being deleted. In this way, the matrix is simplified (the rows are reduced) in the same way that the graph representation is simplified.

Figure 9:
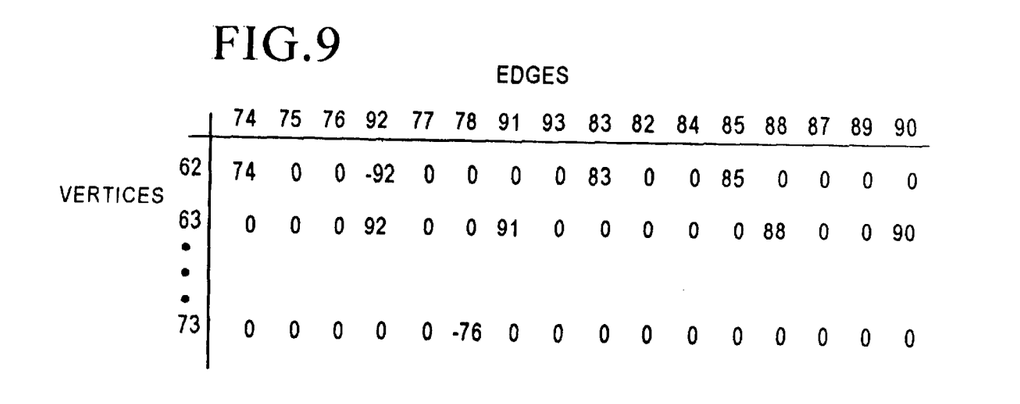
FIGS. 9–11 are representations of a matrix graphical approach involving switching edges being opened/closed like that for FIGS. 6 and 7.

FIG. 9 shows the basic concept of the matrix prior to any graphing operations (similar to the graph of FIG. 4 for graphical representation). The rows represent the twelve vertices of FIG. 2, (only these are actually shown) while the columns represent the 16 possible edges. In FIG. 9, the incident edges for each vertex are represented by the numerals of the edges of FIG. 3. All the other positions in the matrix are set to zero.

Now, again, using the same configuration of FIGS. 5 and 6, the matrix position of switching edges 82, 85, 87, 90 and 93 are set to be open (those positions are set to zero), while switching edges 83, 84, 88 and 89 are closed. Contracting operations are performed for the closed edges for the matrix, leading to the matrix of FIG. 10, which has 4 vertices remaining. Vertex row 100 in the new matrix are original vertex rows 62 and 66; Vertex row 104 represents the combining of original vertex rows 63 and 68; vertex row 102 represents the combining of original vertex rows 64 and 67; while vertex row 106 represents the combining of original vertex rows 65 and 69.

Figure 10:
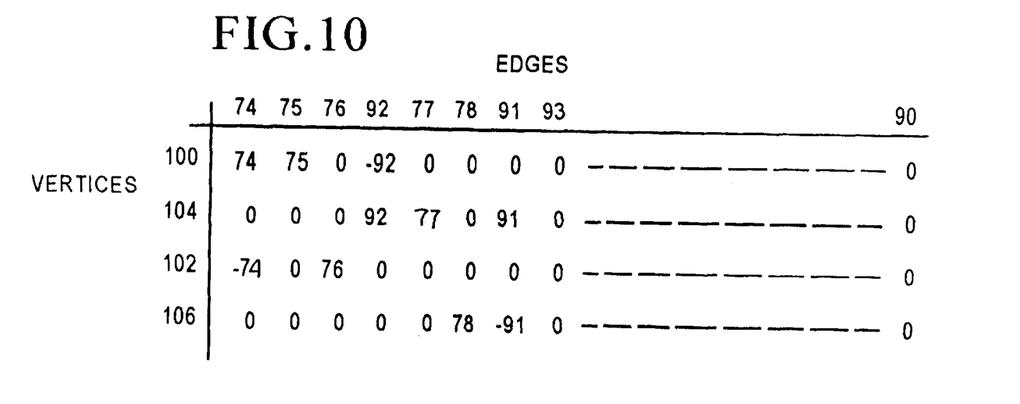

Since, as indicated above, zones of protection cover only bus vertices, the selected Zones 1–4 cover, respectively, combined vertex 100 and weighted edges 74, 75 and −92 (Zone 1); combined vertex 104 and weighted edges 77, 91 and 92 (Zone 2); vertex 102 and weighted incident edges −74 and 76 (Zone 3); and combined vertex 106 and weighted incident edges 78 and −91 (Zone 4). Since, as explained above, incident edges on the bus vertices are only weighted edges 74, 75, 76, 77, 78, 91 and 92, the switching edges 82, 83, 84, 85, 87, 88, 89, 90 and 93 are all zeros in the matrix.

Figure 8:
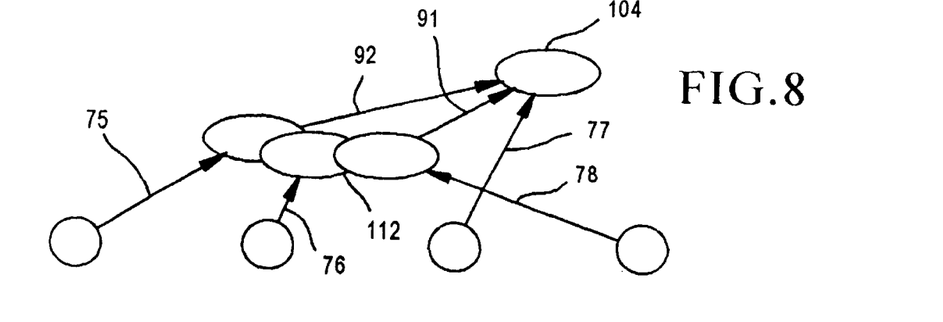
FIG. 8 is a diagram showing a modification of FIG. 7, with an additional edge being closed.
Figure 11:
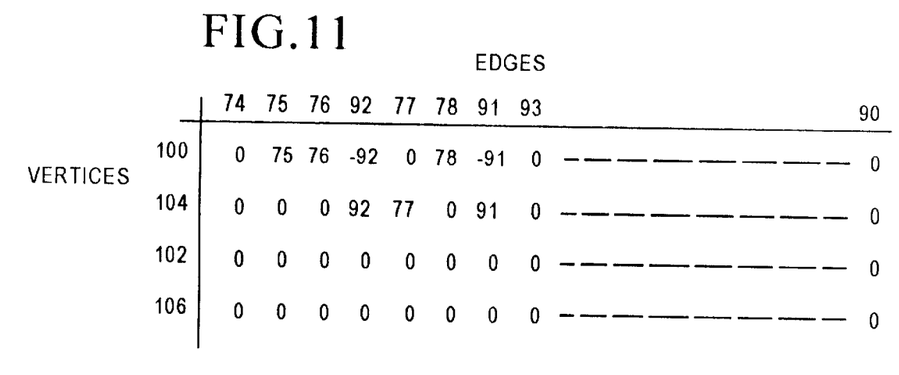

In another matrix example (FIG. 11), similar to the example shown in FIG. 8 for the graph approach, switching edges 82 and 93 are closed, which results in two more rows being contracted, leaving two new combined vertices 112 and 104 remaining, similar to that for FIG. 8. The closing of the switches will change the bus arrangement and the configuration of the matrix, as shown in FIG. 11. The zones of protection will change accordingly, with incident edges for Zone 1 being 75, 76, 78, −91 and −92 and Zone 2 being 77, 91 and 92. Matrix arrangements, i.e. FIGS. 9, 10, and 11, can be processed automatically in the relay to produce zones of protection. Thus, the advantage of the matrix approach of FIGS. 9–11 which is basically equivalent to the traditional graphical representation of FIGS. 6–8, is that it is appropriate for use with microprocessor-based relays.

Implementation of graph-based zone selection is useful in microprocessor-based relays as follows: Microprocessor-based bus relay have common protection functions: bus protection, breaker failure protection and protection zone selection. Zone selection is a basic function in both bus and breaker failure protection schemes. As indicated above, accurate protection zone selection ensures that the protective relay operates according to Kirchhoff's current law in choosing input currents for differential protection. Zone selection also determines the particular circuit breakers to trip in the event of a bus fault or an associated breaker failure. Graph-type operation is a tool which can be used for step-by-step, graphical-type hand manipulation of the bus arrangement and provides a comprehendible picture of the power system station and its operation. Matrixtype operation, using the same graphing principles, is suitable for microprocessor-based operation and processing.

Figure 12:
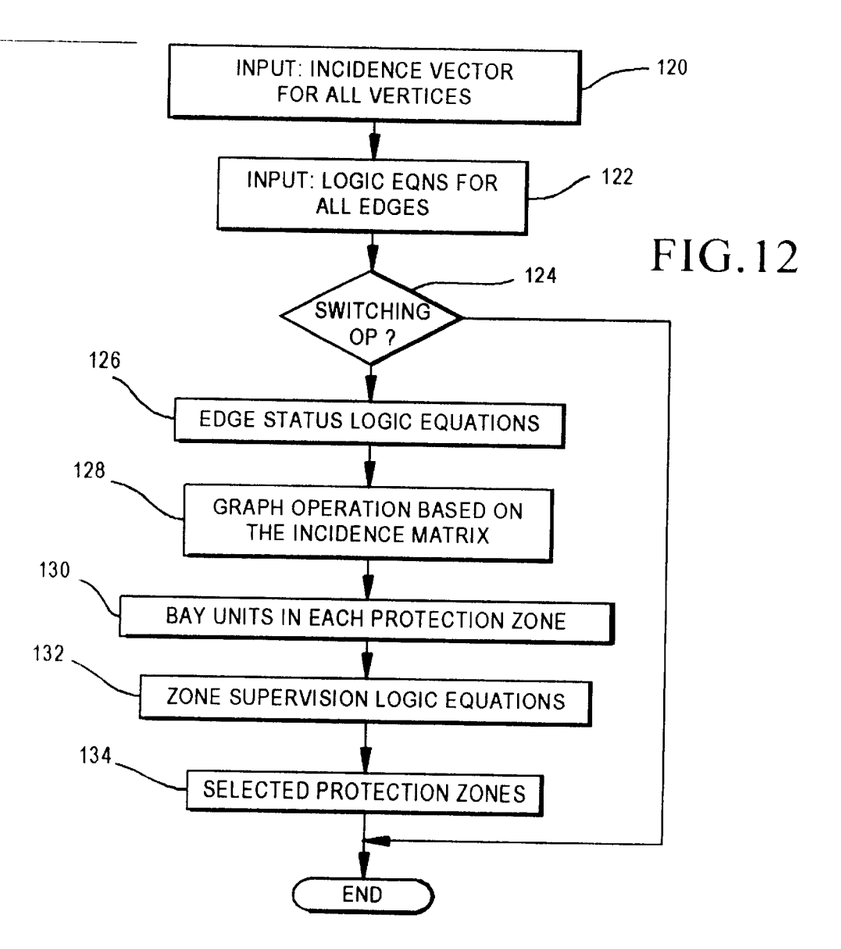
FIG. 12 is a block diagram of the zone selection process of the present invention using graphical representations.

The following describes the use of matrix-type operation to implement protection zone selection. FIG. 12 is a block diagram showing the basic processing steps for matrix-type graph processing. In a first step, referred to at 120, the incidence vector information for all vertices is provided. All edges incident at each of the vertices are entered, with the actual status of the disconnect switches and circuit breakers being represented. In the incidence matrix, which is established before any specific bus configuration is implemented, if the direction of the edge is away from the associated vertex, then a negative sign appears before the edge position in the matrix. If the edge is toward the vertex then no sign appears.

In block 122, the information for all of the edges, i.e. the status of the disconnect switches (open or closed) is provided to the processor. In the protective relay, logic equations express the condition of each edge. If all the switching devices in an edge are closed, the edge is considered by the logic equation as being closed. On the other hand, if any one switching device in an edge is open, the edge is considered by the logic equation as being open.

After the matrix has been constructed and the edges defined, then it is first determined whether any switching operations are to be performed on the matrix, as indicated by block 124. If the matrix is to have a different configuration, because of a change in the status of one or more of selected disconnect switches, due to the decision of the system operator, then the logic equation for each corresponding edge will be carried out, as indicated by block 126.

In block 128, the actual graph operations are performed, corresponding to the open edges and closed edges defined by the logic equations. Vertices are contracted where the edges have been closed. The bay units for each protection zone are then selected (block 130), followed by the application of any zone supervision logic. The resulting selected protection zones are then provided as an output to the relay for use in its current differential fault analysis.

The selected protection zones each include a bus or busses, depending on the graph operations performed, as well as associated bay units. The relay processor runs the matrix algorithm every time the system operator changes the configuration of the bus arrangement.

The protection zone selection system of the present invention also includes logic equations for supervision of the selection process. The logic equations provide threshold requirements and flexibility for the selection process. Zone supervision is useful for complicated bus arrangements because it provides supervision of zone selection without using switch status information but using other digital input relay information. For each zone, there is a corresponding threshold or logic control equation. The relay will check the output of each logic control equation for each zone selection. If the output of the logic circuit is one, there is no supervision to the corresponding zone, while if the logic output equals zero, the relay will block the associated zone. An example of a logic control equation for zone supervision is $Z_s$ (zone supervision)=27ABC, where 27 ABC represents a phase A, B or C undervoltage condition.

The present invention also includes the use of "check zones" for additional protection zone supervision. Check zone supervision does not depend on disconnect switch status information. The check zone supervision is a list of the active bay units. In the case of the arrangement of FIG. 1, the selected active bay units after the interconnects have been entered (FIG. 3) are bay units 23, 24, 26, and 27, which correspond to edges 31, 33, 34 and 35. The check zone element responds to faults in all of the zones but cannot determine the specific zone of protection in which the fault occurs.

Figure 13:
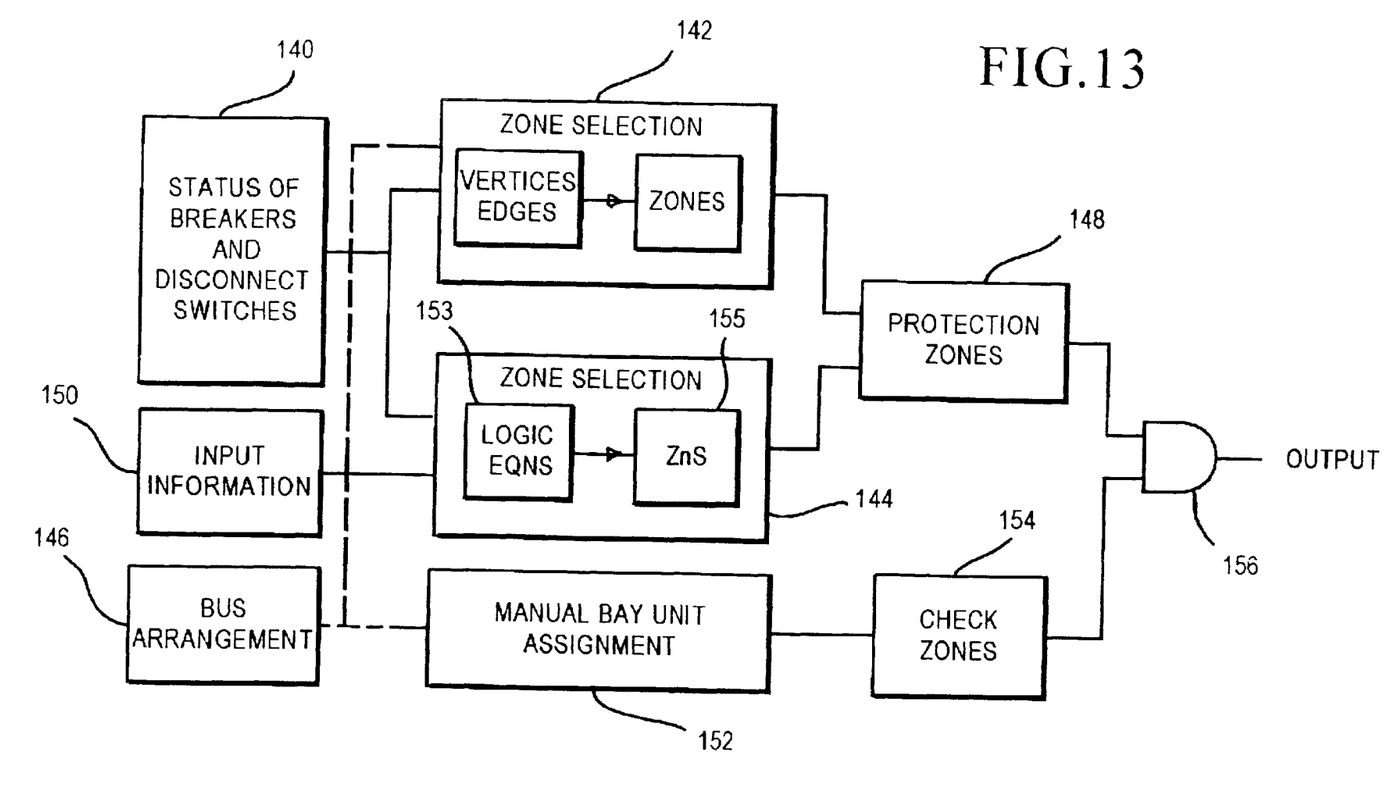
FIG. 13 is a flow chart showing the zone selection process of the present invention.

In the embodiment shown, the output of the bus zone differential element, in the protective relay, is combined with the output of the check zone differential element through an AND gate. If the output of both of the elements are high, indicating a fault determination from the bus zone protection (using the selected zones produced by the system herein and the check zone differential elements), then an output is asserted which results in tripping of the circuit breaker for a particular zone. The overall system flow is shown in FIG. 13. The status of the circuit breakers and the disconnect switches in the bus arrangement (block 140) is provided in the zone selection processing circuit 142 and the zone supervision processor 144. The zone selection processor 142 also receives bus arrangement information (block 146). The zone selection processor determines vertices and edges, establishes a matrix, completes graph operations and establishes zones of protection (block 148). Zone supervision circuit 144 is responsive to breaker and disconnect switch status information (block 140) and other bus inputs (block 150) to accomplish the zone supervision through logic equations (153) and zone supervision (155) functions.

The bus arrangement information is used to determine the bay unit arrangement (block 152) and the check zones (block 154), the output of which is applied to an AND gate 156 along with the output of the protective zone determination to produce a "trip" output, if necessary, of the differential relay.

Figure 14:
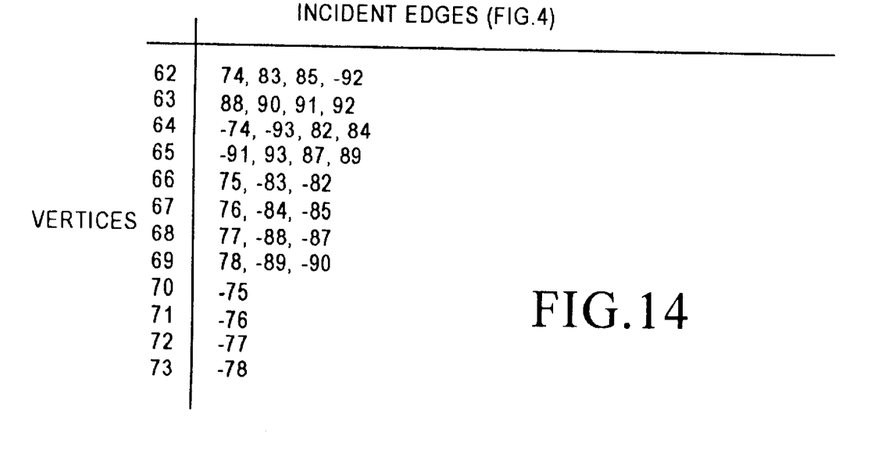
FIG. 14 is a table showing a setting format for the incidence vectors for the bus arrangement of FIG. 1.

The following is one specific example of the use of the zone selection system of the present invention to provide differential protection for a bus arrangement. As discussed above, FIG. 4 is a graphical representation of the bus arrangement of FIG. 1. The setting format for the incident edges on the various vertices is shown in the table of FIG. 14. As shown in FIG. 1–3, each of the edges has specific switch elements (one or more) in its branch. For instance, edge 74, which is a tie breaker connecting busses 12 and 16, includes two disconnects 40 and 41 and a circuit breaker-CT 30. Edge 75, which extends between vertices 66 and 70 includes a breaker-CT branch 31. The information of FIG. 1 concerning the composition of each of the edges is entered into the processor. With this information entered, various operational configurations, involving different switch status arrangements, can be processed.

In an example for the graph of FIGS. 5 and 6, FIG. 14 shows the basic setting for the incidence vectors of FIG. 4. Edges 93, 82, 85, 87, and 90 are opened by disconnect switches, with all the circuit breakers being closed. The result, in graph form, is shown in FIGS. 5 and 6. Four zones of protection are created relative to bay units. The first zone for vertex 100, with incidence edges 75, 74 and −92, thus includes associated bay units 22, 23 and −25 (breaker-CT branches 30, 31 and 33); the second zone (vertex 104, edges 92, 91 and 77) includes bay units 26, 25, and 28 (breaker-CT braches 34, 33 and 36); the third zone (vertex 102, edges 76, −74, includes bay units −22 and 24 (breaker-CT branches 30 and 32); and the fourth zone (vertex 106, edges 78 −91 includes bay units 27 and −28 (breaker-CT breakers 35 and 36).

Hence, the zones of protection for FIG. 14 and the differential relay are characterized in terms of bay units associated with breaker-CT branches. Each of the bay units is responsive to faults detected in its zone. The check zone bay units for this example are 23, 24, 26 and 27. The check zones provide a supervision for the protection zone selection, as discussed above.

In another example, switches 47, 52, 56 and 51 in FIG. 1 are all opened by the system operator, in order to transfer branch 31 from bus 12 to bus 16. The busses 12 and 16 are solidly linked by switches 43 and 44 during the transfer period. Using graph operations, the resulting zone selection is as follows: Zone 1 covers bay units 23, 24 and −25; Zone 2 covers bay units 25, 26 and 28; and Zone 4 covers bay units 27 and −28. In this case, two busses 12 and 16 are covered by Zone 2, so there is no Zone 3. During the transfer period, breaker bay unit 22 is not included in the two-bus protection zone.

The check zone differential elements for this example are the same as for the previous example, since the basic bus arrangement is the same, even though the switch configuration is different. Other specific switch configurations for other system conditions, involving other combinations of disconnect switches being open/closed, will result in other protection zone selection results.

Figure 15:
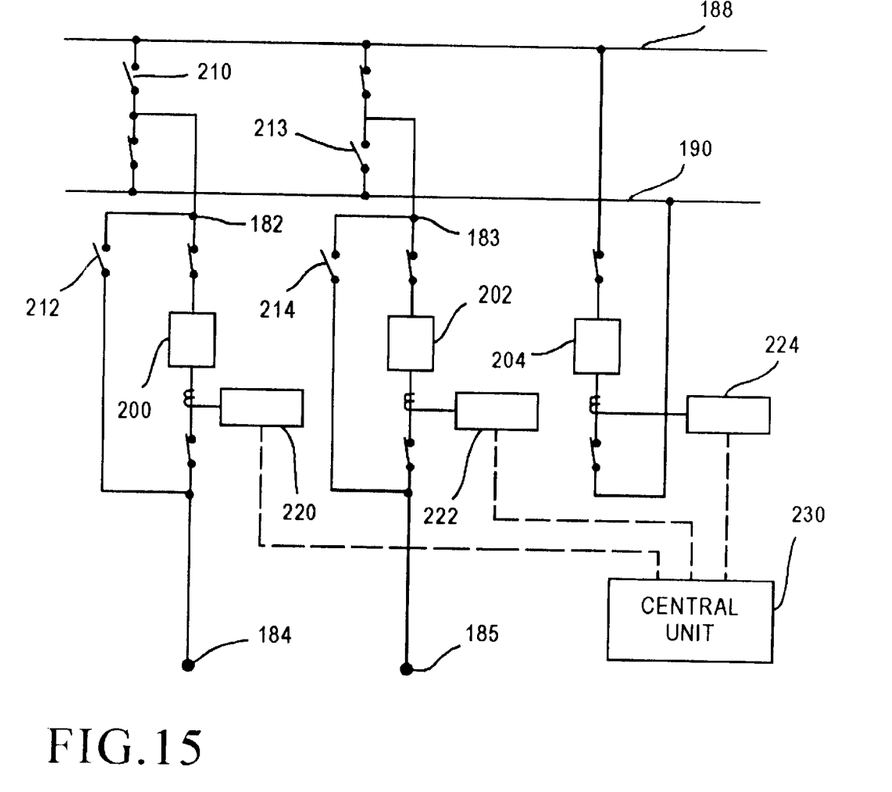
FIG. 15 is a diagram showing a second example of a power system bus arrangement, using a double bus, single breaker and a by-pass switch.

FIG. 15 is a diagram of a second particular bus arrangement, involving a double bus/single breaker arrangement, with a bypass line switch. This arrangement provides greater flexibility for power system operations than the arrangement of FIG. 1. Either bus in the system of FIG. 15 provides service to any line. Further, the busses can operate together or independently; one bus in addition can act as a transfer bus if a line breaker is out of service.

Figure 16:
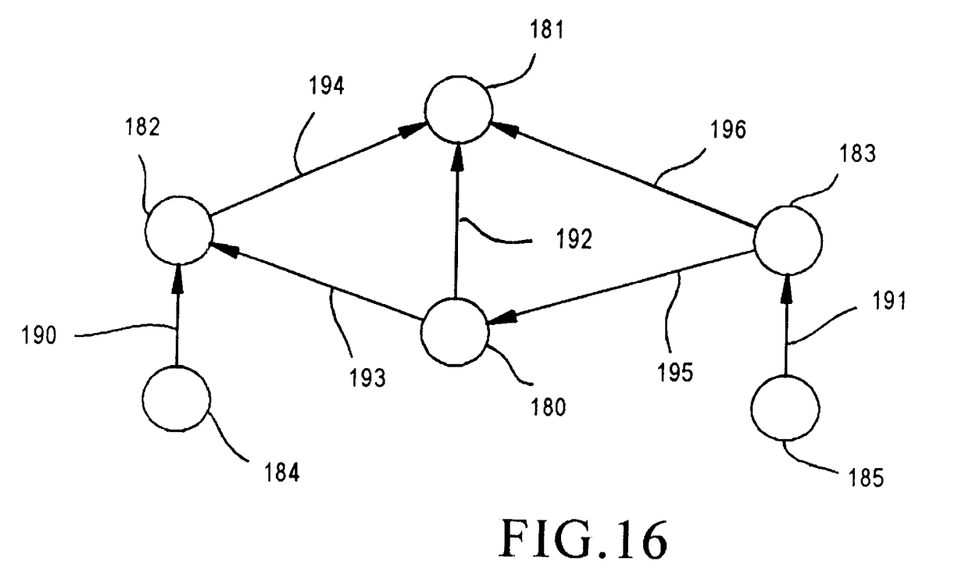
FIG. 16 is a graphical diagram showing vertices and edges representing the bus arrangement of FIG. 15.

FIG. 16 is a graph representation for the bus arrangement of FIG. 15, including six vertices 180–185 and seven edges, 190–196, shown with reference direction for each edge. Vertices 180 and 181 represent the two busses 188, 190. Vertices 182 and 183 are the convergence points between the disconnect branches and breaker CT branches. Vertices 184 and 185 are termination points for two of the breaker CT branches 200 and 202. Edges 190 through 192 represent the breaker CT branches 200, 202 and 204, while edges 193 through 196 represent disconnect branches associated with vertices 180, 181, 182 and 183. There are three bay units, 220, 222 and 224, associated, respectively, with breaker-CT branches 200, 202 and 204, and a central unit 230.

In operation, information is entered into the processor concerning each of the vertices and each of the edges, with their associated switches. When one or more switches are opened to produce a particular system configuration, zones of protection are automatically selected, using bay units designations. Check zone supervision is added if necessary. In one specific operational example, all circuit breakers are closed, and disconnect switches 210, 212, 213 and 214 (FIG. 15) are open, with the remaining disconnect switches being closed. This means that using the logic equation defining the condition of the edges, edges 194, 190 and 195 and 191 will be open. Zone 1 will protect bus 190, using bay units 220 and −224, while Zone 2 will cover bus 188 using bay units 222 and 224.

Hence, a new system for representing complex bus arrangements has been disclosed which makes possible automatic processing for protection zone selection. Each of the protection zones has associated therewith bay units which in combination with a central unit produce the differential current determination for each zone of protection.

The zone determination can, if desired, be supervised by traditional zone differential elements so as to provide a reliable output for tripping action.

Although a preferred embodiment has been disclosed for purposes of illustration, it should be understood that various changes, modifications and substitutions can be made without departing from the spirit of the invention which is defined by the claims which follow:

What is claimed is:

1. A system for protection zone selection for a power system bus, comprising:

means for receiving information concerning a bus arrangement in a power system, including the number of busses in the arrangement, and graph based information concerning the arrangement, including the identification of vertex and edge portions of the bus arrangement, wherein said edges include disconnect circuit branches and circuit breaker-current transformer (CT) branches and said vertices include the busses and convergence points between disconnect branches and circuit breaker-CT branches;

means for receiving the operational status of the disconnect branches and the circuit breakers, said operational status defining a selected operational configuration of the bus arrangement;

processor means for establishing an incidence graph arrangement indicative of said vertices and edges and for altering the established graph arrangement based on an actual operational status of the disconnect switches and the circuit breakers; and means for selecting a series of protection zones covering the busses in the bus arrangement, from the graph arrangement.

2. A system of claim 1, wherein the operational configuration of the bus arrangement is controllable by a system operator.

3. A system of claim 1, wherein the graph arrangement is a graph matrix.

4. A system of claim 1, including means for processing the power line signal for each of the zones of protection to determine the presence of a fault within each zone of protection and for producing an output signal indicative of a fault when a fault is present with said each said zone of protection.

5. A system of claim 3, wherein the incident graph matrix includes all of the incident vertices and edges comprising the bus arrangement.

6. A system of claim 5, wherein closing a disconnect switch results in contracting two vertices into a single combined vertex in the graph vertex.

7. A system of claim 4, including logic for supervising said output signal.

8. A system of claim 3, wherein the establishing of the graph matrix is carried out automatically.

9. A system of claim 1, wherein each zone of protection covers at least one bus and associated edges incident thereon.

10. A system of claim 9, wherein each zone of protection includes at least one data acquisition unit associated with a particular edge in the graph matrix representation of the bus arrangement.

11. A system of claim 10, wherein the particular edge is a breaker-CT branch.

* * * * *